(12) United States Patent
Manine et al.

(10) Patent No.: US 6,484,944 B1
(45) Date of Patent: Nov. 26, 2002

(54) OPTOELECTRONIC DEVICE FOR ACQUIRING IMAGES OF PLANES, SUCH AS BAR CODE SYMBOLS

(75) Inventors: Pierre-Marie Manine, Pibrac; Jean-Louis Massieu, Montauban; Bernard Puybras, Toulouse; Bernard Serres, Dremil Lafage; Serge Thuries, Saint Jean, all of (FR)

(73) Assignee: Intermec IP Corp., Woodland Hills, CA (US)

( * ) Notice: Subject to any disclaimer, the term of this patent is extended or adjusted under 35 U.S.C. 154(b) by 19 days.

(21) Appl. No.: 09/656,090

(22) Filed: Sep. 6, 2000

(30) Foreign Application Priority Data

Sep. 10, 1999 (FR) .............................. 99 11357

(51) Int. Cl.[7] ................................ G06K 7/10
(52) U.S. Cl. .................. 235/462.38; 235/462.18; 235/462.25; 235/462.28; 235/462.41; 235/474
(58) Field of Search ................ 235/462.25, 462.36, 235/462.38, 462.39, 472.01, 454, 462.11, 462.18, 462.2, 462.28, 462.41, 462.42, 474; 359/216, 217, 218, 219

(56) References Cited

U.S. PATENT DOCUMENTS

| 4,613,877 | A | * | 9/1986 | Spencer et al. | ............. 346/160 |
|---|---|---|---|---|---|
| 5,010,272 | A | * | 4/1991 | Frontino | ..................... 235/467 |
| 5,212,581 | A | * | 5/1993 | Brash | ......................... 359/216 |
| 5,329,103 | A | * | 7/1994 | Rando | ......................... 235/462 |
| 5,530,642 | A | * | 6/1996 | Lofthus et al. | ............. 364/174 |
| 5,557,315 | A | * | 9/1996 | Meyers et al. | ............. 347/244 |
| 5,612,172 | A | * | 3/1997 | Wess et al. | ................... 430/347 |
| 5,767,500 | A |   | 6/1998 | Cordes et al. | |
| 5,767,501 | A | * | 6/1998 | Schmidt et al. | ............. 235/472 |
| 5,786,581 | A | * | 7/1998 | Eastman | ..................... 235/455 |
| 5,804,805 | A | * | 9/1998 | Koenck et al. | ............. 235/462 |

FOREIGN PATENT DOCUMENTS

| EP | 0 384 955 A2 | 9/1990 |
|---|---|---|
| EP | 0 685 812 A2 | 12/1995 |
| EP | 0 690 401 A2 | 1/1996 |
| EP | 0 871 138 A2 | 10/1998 |
| EP | 0 940 703 A2 | 9/1999 |

* cited by examiner

*Primary Examiner*—Karl D. Frech
*Assistant Examiner*—Uyen-Chau N. Le
(74) *Attorney, Agent, or Firm*—Seed Intellectual Property Law Group PLLC

(57) ABSTRACT

An optoelectronic device for acquiring images of planes, such as bar codes, includes a deflector for deflecting an incident beam emitted by a light source such as an oscillating or rotating cyclic polygonial deflector or mirror. A driver osscilates or rotates the deflector in such a way that the incident beam describes, during each cycle, angular scanning adapted to generate at least one elementary scanning line on the plane. A closed loop control circuit controls the driver and is connected, on the one hand, to the clock in order to receive the transfer signal $\Phi_{TG}$ and, on the other hand, to the driver and adapted to synchronize the beginning of each scanning cycle in phase and frequency with the signal $\Phi_{TG}$ emitted by the clock.

22 Claims, 3 Drawing Sheets

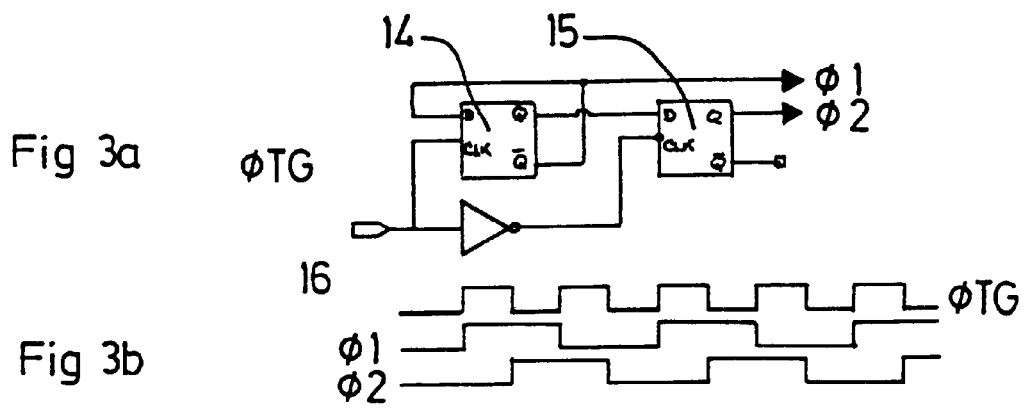
Fig 3a
Fig 3b
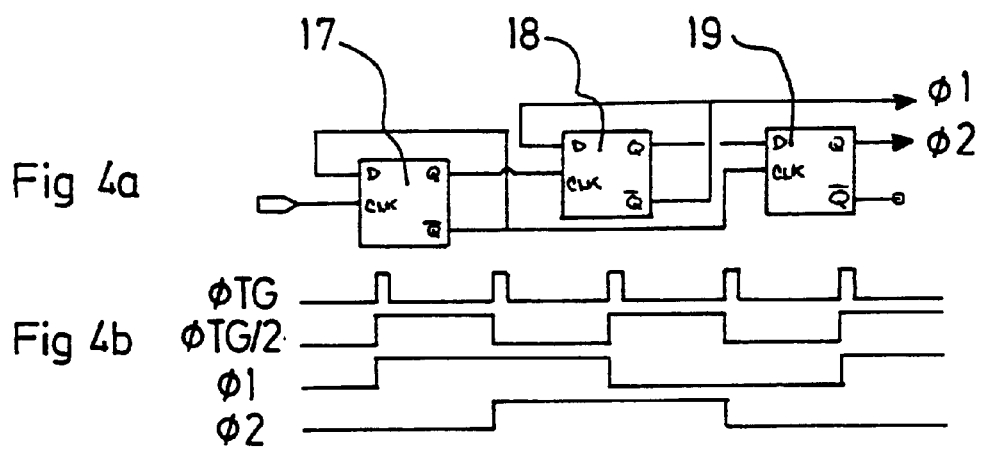
Fig 4a
Fig 4b
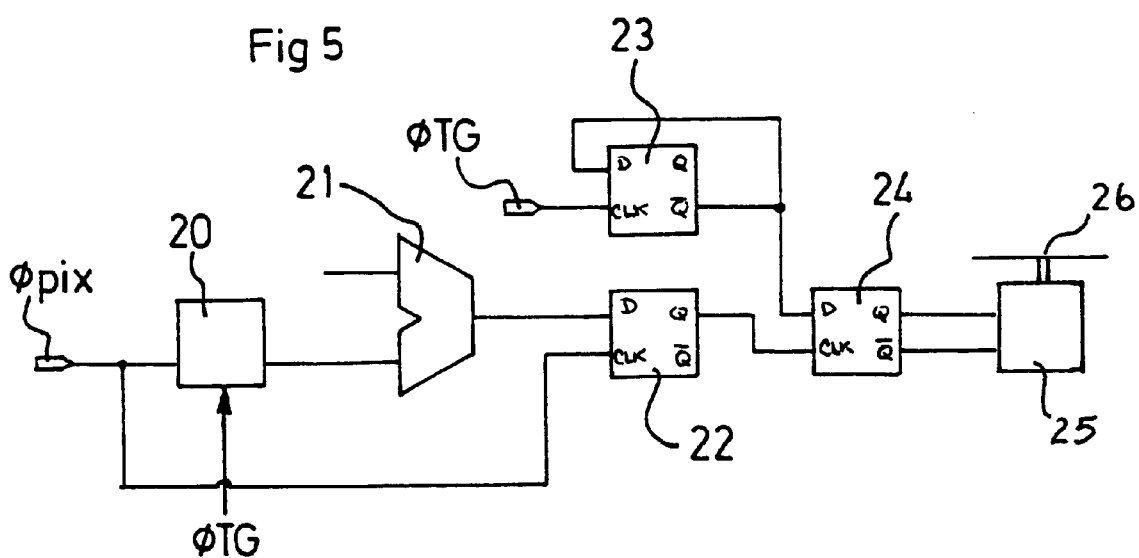
Fig 5

OPTOELECTRONIC DEVICE FOR ACQUIRING IMAGES OF PLANES, SUCH AS BAR CODE SYMBOLS

TECHNICAL FIELD

The invention relates to an optoelectronic device for acquiring images of planes, such as bar code, area code, matrix or stacked code symbols.

BACKGROUND OF THE INVENTION

At present there are two large groups of optoelectronic devices for reading bar codes and other symbols which each have their own advantages: CCD reading devices and laser reading devices.

CCD reading devices comprise, in the first instance, a lighting system generally consisting of high-intensity light-emitting diodes arranged so as to illuminate the bar codes. These devices also comprise a lens for forming the image of the bar code on the light-sensitive elements of the CCD for a pause time known as integration time. After this integration time, a clock emits a transfer signal $\Phi_{TG}$ controlling the transfer of information contained in the light-sensitive elements of the CCD to an analogue shift register. A second clock then delivers a pixel signal $\Phi_{pix}$ which controls the sequential reading of the code image. During this sequential reading, a further image can thus be exposed in the light-sensitive elements of the CCD.

This type of CCD reading device has two main advantages. Firstly, the scanning of the image is entirely electronic and therefore does not require a moving part. Furthermore, this CCD technology allows high reading speeds for a cost price lower than that of laser technology devices.

Laser reading devices, for their part, firstly comprise a source, generally a laser diode, of emission of a laser beam which is focused by an optical system. They also comprise a mechanism of rotating or oscillating mirrors for deflecting the laser beam so that it describes annular scanning which forms an elementary scanning line when projected on the bar code. These devices also comprise an electro-optical system positioned so as to intercept the beginning of scanning and to emit a pulse representative of the beginning of the line to enable the decoding system to be synchronized. With this technology, the laser light reflected by the bar code is collected either by tracing the reverse path of the incident beam or by stationary global retro-collection, and directed toward a light-sensitive system such as a photodiode which creates an instantaneous electrical signal, that is without accumulation of charges, representative of the image of the bar code.

This type of laser reading device has the advantage of offering a greater depth of field and insensitivity to movement, in particular when the device is displaced perpendicularly to the bars of the code.

The differences in design of these two types of optoelectroric device, in particular with respect to processing of the image, mean that there are currently two completely different ranges of products belonging to each of the two families.

SUMMARY OF THE INVENTION

It is the object of the present invention to provide an optoelectronic device designed to allow the reading and decoding of images issuing either from a CCD type read head or a laser type read head.

To this end, the invention relates to an optoelectronic device for acquiring images of sprite planes, such as bar code symbols. In one aspect an opto-electronic device, comprises:

- a lighting source capable of emitting an incident light beam,
- an electronic sensor for acquiring images,
- optics for forming images on the electronic sensor; and
- a processor for reading and decoding the images acquired by the sensor and comprising a clock adapted to emit a transfer signal $\Phi_{TG}$ of each image acquired by said sensor.

In another aspect, the device comprises:

- deflecting means for the incident beam comprising oscillating or rotating cyclic deflector driven by a driver for causing said cyclic deflector to oscillate or rotate in such a way that the incident beam describes, during each cycle, angular scanning adapted to generate at least one elementary scanning line on the plane,
- a closed loop control circuit for controlling the driver coupled, on the one hand, to the clock in order to receive the transfer signal $\Phi_{TG}$ and, on the other hand, to said driver and adapted to synchronize the beginning of each scanning cycle in phase and frequency with the signal $\Phi_{TG}$ emitted by the clock.

The invention therefore involved substituting a module for reading symbols such as bar codes with a laser beam designed to be controlled by the processor of a CCD technology reader for the electro-optical assembly of a CCD technology bar code reader (CCD strip, lens, lighting).

To this end, the device according to the invention comprises closed loop control circuit for controlling the laser beam-type read module on the basis of the available transfer signal $\Phi_{TG}$ so as to supply an analogue signal comparable to the one originating from a CCD sensor which can therefore be processed and decoded by CCD technology processing means.

Starting with a single base incorporating CCD technology processing means, the concept of the invention therefore offers two groups of optoelectronic devices involving CCD and laser technology.

According to a first advantageous variation of the invention:

- the cyclic deflector can take the form of a rotating polygon having n reflective facets,
- the driver can take the form of a stepper motor coupled to rotate or oscillate the rotating polygon, said motor having a number of steps per revolution equal to kn, wherein k=x or 1/x, x being an integer,
- the closed loop control circuit can take the form of a sequential controller coupled to the stepper motor to produce control phases of said stepper motor synchronized with the signal $\Phi_{TG}$ emitted by the clock.

According to this variation employing a rotating polygon, the use of a stepper motor eliminates the constraint of closed loop speed control. Furthermore, the provision of a motor with a number of steps which is a multiple or sub-multiple of the number of facets of the polygon eliminates the constraint of closed loop phase control and allows the beginning of scanning to be detected. An extremely simple sequential controller is therefore sufficient to produce the phases of control of the step-by-step motor on the basis of a single transfer signal $\Phi_{TG}$.

The controller can therefore advantageously consist of sequential electronics comprising flip-flops for generating two phases of control of the stepper motor.

Furthermore, to ensure that the video signal and the transfer signal $\Phi_{TG}$ are in phase, the device according to one aspect of the invention advantageously comprises means for prior adjustment of the angular position of the body of the step-by-step motor.

To this end, the body of the stepper motor is advantageously sandwiched between two stationary elements in which the bearings of said stepper motor are rotatably mounted, the adjustment means comprising means for fixing the body of said motor to at least one of said stationary elements after prior adjustment of the angular position of said body.

In addition, according to an advantageous embodiment, the axis of rotation of the polygonal mirror is inclined to the edges of the facets by an angle α adapted such that each facet creates a shifted scanning line parallel to that created by the adjacent facets.

This arrangement allows the scanning lines generated by each facet to be shifted in a very simple manner so that the code can be scanned in a direction parallel to the bars of the symbol.

The angle α of inclination of the axis of rotation of the rotating polygon is advantageously substantially equal to one quarter of the angle subtended by the edges delimiting a facet.

According to a second advantageous variation relating to a device comprising, conventional CCD technology, a clock emitting a pixel signal $\Phi_{pix}$ for sequential reading of each image acquired by the sensor, wherein:

the cyclic deflector can take the form of an oscillating mirror coupled to the driver to oscillate the cyclic deflector with a predetermined amplitude between two extreme positions, the closed loop control circuit of the driver comprises:
a counter incremented by the signal $\Phi_{pix}$ for sequential reading and adapted to be reset to zero during the emission of a transfer signal $\Phi_{TG}$,
a comparator configured to compare the value of the counter with a stored value obtained by prior learning and representative of the phase displacement required to obtain the phase synchronization of the beginning of each scanning cycle with the signal $\Phi_{TG}$, said comparator emitting a phase synchronization signal when the stored value corresponds to the value in the counter,
a controller coupled to the driver and receiving the transfer signal $\Phi_{TG}$ and the phase synchronization signal and adapted to synchronize said driver with said transfer signal $\Phi_{TG}$.

According to this variation employing an oscillating mirror, the transfer signal $\Phi_{TG}$ is used to control the phase and speed of the oscillations of said mirror.

Moreover, the pixel signal $\Phi_{pix}$ associated with the counter and the comparator allows the phasing of the video signal and the transfer signal $\Phi_{TG}$ on the basis of a stored phase displacement value obtained in a prior learning phase.

Furthermore, according to this variation, the controller for the driver advantageously comprise electronics containing flip-flops D for generating oscillating mode control signals for the driver.

Further characteristics, aims and advantages of the invention will emerge from the following detailed description given with reference to the accompanying drawings which show non-limiting examples of a preferred embodiment of a laser technology read module according to the invention as well as three variations of closed loop control circuit according to various aspects of the invention.

BRIEF DESCRIPTION OF THE DRAWINGS

FIG. 3a is an electronic diagram of a first variation of a control circuit for the stepper motor driving the rotating polygon, according to the invention.

FIG. 3b shows the transfer signal $\Phi_{TG}$ and the control signals generated by this control circuit.

FIG. 4a is an electronic diagram of a second variation of a control circuit of a stepper motor for driving the rotating polygon, according to the invention.

FIG. 4b shows the transfer signal $\Phi_{TG}$ and the control signals generated by this control circuit.

FIG. 5 is an electronic diagram of a control circuit for the motor for driving an oscillating mirror, according to the certain aspects of the invention.

DETAILED DESCRIPTION

Figure 1:
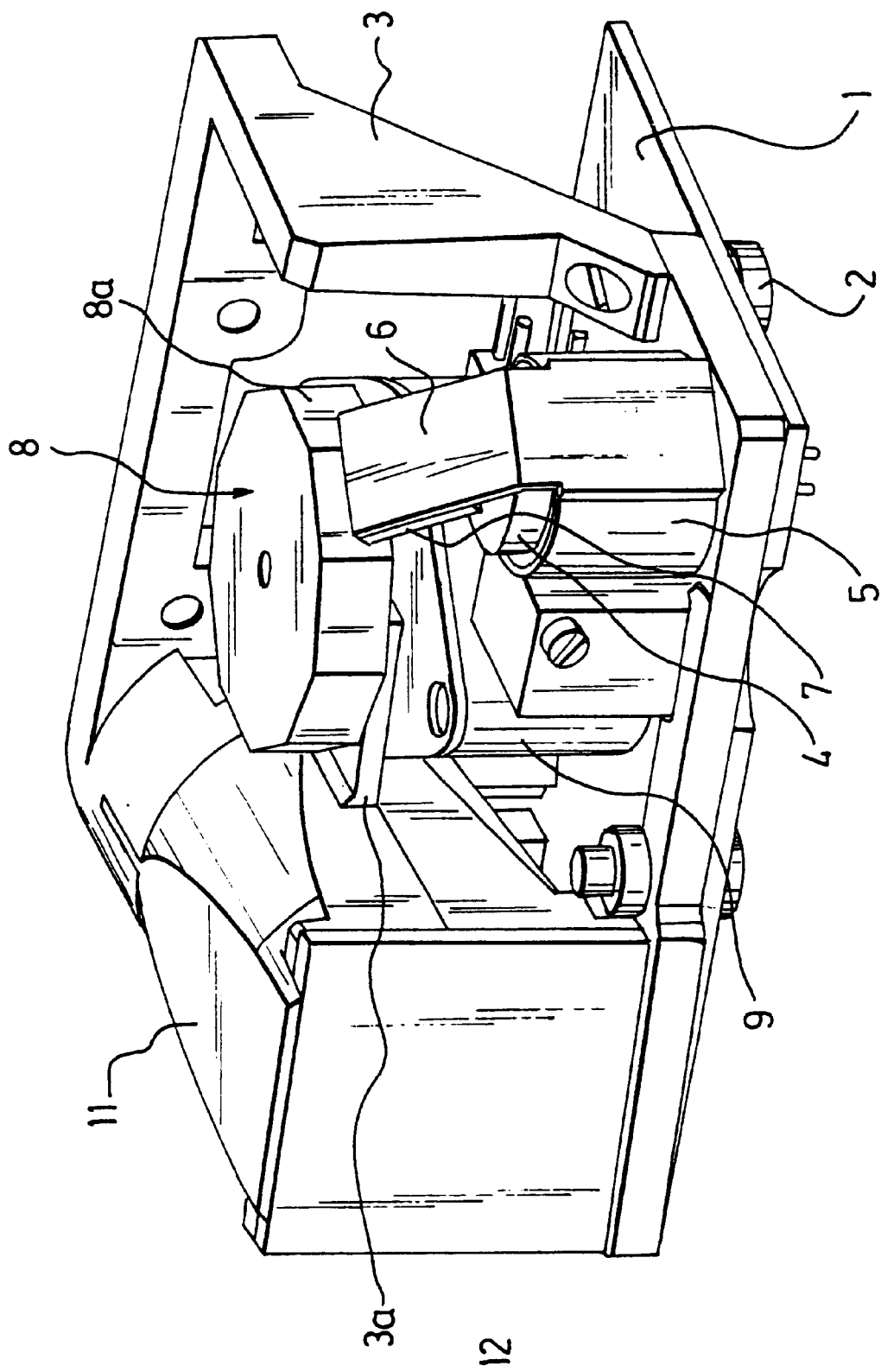
FIG. 1 is a perspective view of a rotating polygon-type read module according to the invention.
Figure 2:
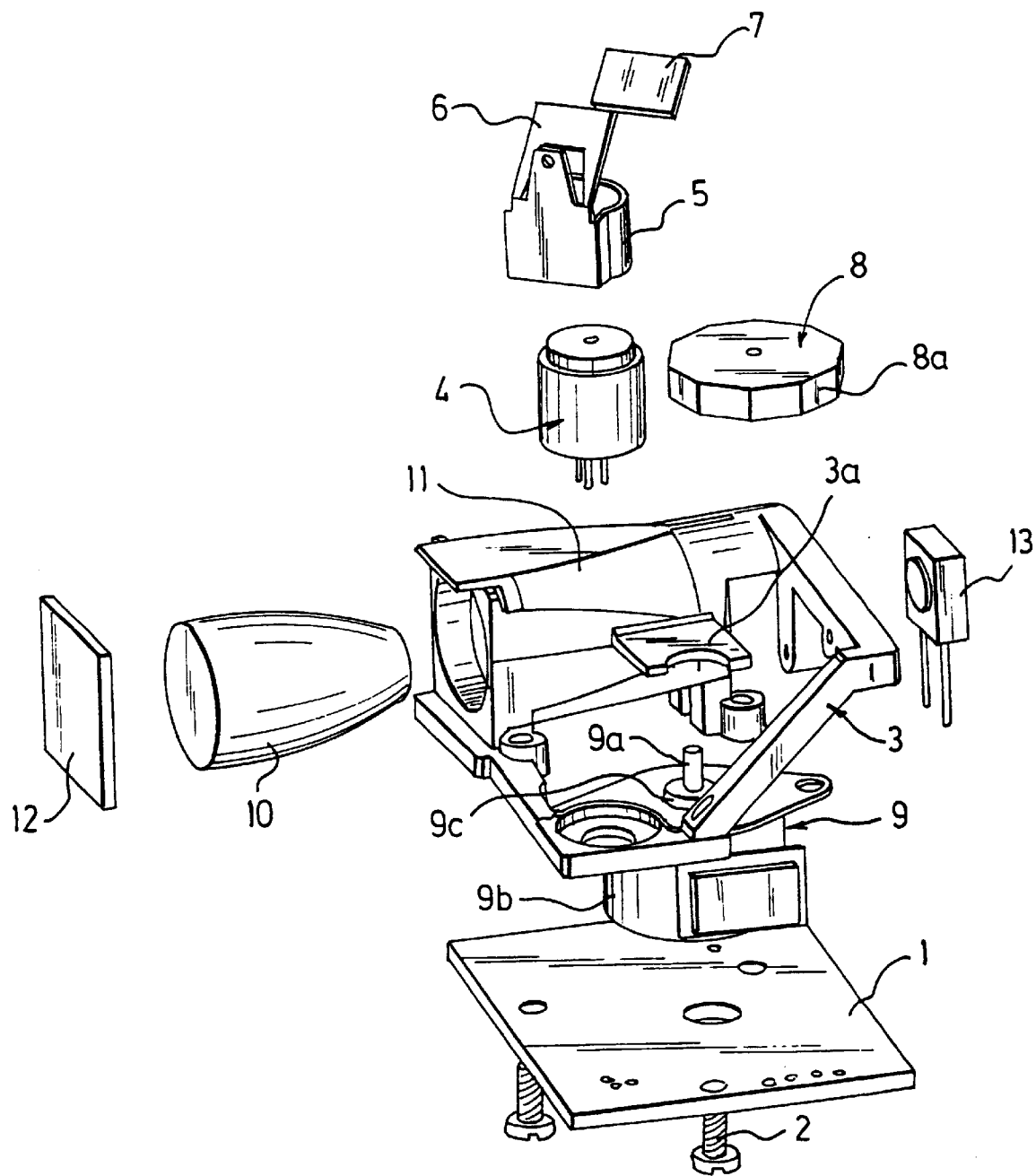
FIG. 2 is an exploded perspective view of the various components of this read module.

The laser technology read module shown in FIGS. 1 and 2 is designed to replace an electro-optical assembly of a CCD technology symbol reader (e.g., bar code reader) and, for this purpose, to be completely compatible with this assembly from both an electrical and mechanical point of view (optical bulk and path) and from a software point of view (reading/decoding).

This read module comprises a printed circuit board 1 on which is fixed, by means of screws 2, a cradle-shaped support 3 on which the various electro-optical elements are mounted.

The first of these elements consists of a laser diode associated with a focusing optical system, designated generally by reference numeral 4 in FIGS. 1 and 2. This laser diode is accommodated in a ring 5 arranged such that the laser beam is emitted orthogonally to the printed circuit board 1.

In addition, this ring 5 is extended by a deflector 6 which is inclined at 45 to the axis of said ring and has a mirror 7 for deflecting the beam emitted by the laser diode 4 through 90° fixed on its lower face.

The second element consists of a polygon 8 provided with reflective facets such as 8a arranged so as to intercept the beam deflected by the mirror 7. This polygon 8 is mounted on the shaft 9a of a stepper motor 9 of which the body 9b is sandwiched by its bearings such as 9c between an arm 3a of the support 3 and the printed circuit board 1.

The third element consists of a non-imaging light collector 10 of paraboloidal shape arranged so as to collect the light reflected by the laser spot wherever it is in the reading zone of the device.

This collector 10 is accommodated in a tube 11 machined integrally with the support 3 and blocked by a polarizing filter 12 intended to eliminate variations in light and to avoid saturating the fourth element consisting of a photodiode 13 arranged at the back of said collector.

As an example, the motor 9 is a stepper motor having 20 steps per revolution, which is sufficiently compact to enable the read module to be accommodated in the space equivalent to a CCD read module. Furthermore, the retrocollector formed by the non-imaging collector 10 and the polygonal mirror 8 produced from injection-molded plastics material, has small dimensions (for example D=15 mm, H=3 mm) and therefore low inertia.

Also as an example, with a polygon 8 having 10 facets 8a driving at 25 revolutions per second, wide angle scanning of 72° is obtained, including 60° which are useful at 250 scans per second. With a polygon 8 having 20 facets 8a driven at 25 revolutions per second, scanning by an angle equal to 36° is obtained, of which 30 are useful at 500 scans per second.

FIG. 3a shows a first example of an electronic interface allowing a read module as described above to be controlled, and allowing the phases of control of the stepper motor 8 to be produced on the basis of a single transfer signal $\Phi_{TG}$ emitted by the processing module of the optoelectronic device. For this example, the motor 9 is a bipolar motor with 20 steps per revolution, and the polygon 8 has 10 facets 8a.

As shown in this figure, this interface comprises two flip-flops 14, 15: a first flip-flop 14 that receives the $\Phi_{TG}$ signal on its input CLK and a second flip-flop 15 that receives the signal $\Phi_{TG}$ on its input CLK after reversal thereof by a changeover switch 16.

Furthermore, the output $\overline{Q}$ of the first flip-flop 14 is firstly looped back to the input D of this flip-flop 14 and secondly transmits a first phase $\Phi 1$ for controlling the stepper motor 9. The output Q of the first flip-flop 14 is transmitted to the input D of the second flip-flop 15.

The second phase $\Phi 2$ for controlling the stepper motor 9 is transmitted from the region of the output Q of the second flip-flop 15.

As shown in FIG. 3b, an interface of this type is adapted to generate two phases $\Phi 1$, $\Phi 2$ in quadrature to control the stepper motor 9 of which the periods are twice the period of the signal $\Phi_{TG}$. In addition, $\Phi 2$ is in quadrature lag relative to $\Phi 1$ so that the direction of rotation is determined perfectly.

FIG. 4 shows a second example of electronic interface for controlling a read module as described above on the basis of a single transfer signal $\Phi_{TG}$. In this example, the stepper motor 9 is a bipolar motor with 20 steps per revolution, and the polygon 8 has 20 facets.

As shown in this figure, the interface comprises three flip-flops 17, 18, 19 arranged so that:
- the first flip-flop 17 receives the signal $\Phi_{TG}$ in the region of its input CLK whereas its output Q is connected to the input CLK of the second flip-flop 18 and its output $\overline{Q}$, firstly looped back to the input D of this flip-flop 17 and secondly connected to the input CLK of the third flip-flop 19.
- the output Q of the second flip-flop 18 is connected to the input D of the third flip-flop 19 whereas the output $\overline{Q}$ of this second flip-flop 18 is firstly looped back to the input D thereof and secondly transmits a first phase $\Phi 1$ for controlling the stepper motor 9.
- the second phase $\Phi 2$ for controlling the stepper motor 9 is transmitted from the region of the output Q of the third flip-flop 19.

As shown in FIG. 4b, an interface of this type is adapted to generate:
- a signal $\Phi_{TG}/2$ in the region of the output $\overline{Q}$ of the first flip-flop 17,
- two phases $\Phi 1$ $\Phi 2$ in quadrature to control the stepper motor 9 of which the periods are the quadruple of the period of the signal $\Phi_{TG}$. Furthermore, $\Phi 2$ is in quadrature lag relative to $\Phi 1$ so that the direction of rotation of the stepper motor 9 is determined perfectly.

For the two interfaces described above, the closed loop phase and speed control is therefore achieved by the bias of flip-flops on the basis of the mere transfer signal $\Phi_{TG}$.

With regard to the initial phasing of this signal $\Phi_{TG}$ and of the analogue signal transmitted by the photodiode 13, it is produced in a preceding phase by adjustment of the angular position of the body 9b of the stepper motor 9 then fixing by any means known per se of said stepper motor relative to the support 3, once this phasing has been achieved.

FIG. 5, for its part, shows an interface adapted to control the oscillations of an oscillating mirror 26 provided on a laser technology read module of a conventional type. According to this variation, the signals $\Phi_{pix}$ and $\Phi_{TG}$ transmitted by the processing module of the optoelectronic device are used for the phasing and closed loop phase and speed control of the motor 25 driving the oscillation of the mirror 26 relative to the transfer signal $\Phi_{TG}$.

In the first instance, to achieve the phasing, this interface comprises a counter 20 which is incremented by the signal $\Phi_{pix}$ and is reset to zero when a signal $\Phi_{TG}$ is emitted.

The incremented value of this counter 20 is transmitted to one of the inputs of comparator 21 for comparing this value with a stored value obtained by learning in a previous phase and representative of the time lag required after emission of the transfer signal to allow phasing.

The signal emitted by this comparator 21 and indicating correspondence between the incremented and stored values is transmitted to the input D of a flip-flop 22 of which the operation is controlled by the signal $\Phi_{pix}$. A flip-flop D of this type, by means of the lag of a pulse of the signal transmitted by the comparator 21, allows correct shaping of said signal.

The closed loop phase and speed control, for its part, is achieved by means of two flip-flops 23, 24:
- a first flip-flop 23 of which the operation is controlled by the signal $\Phi_{TG}$ and of which the output $\overline{Q}$ is firstly looped back to the input D of said flip-flop and secondly connected to the input D of the second flip-flop 24,
- a second flip-flop 24 of which the operation is controlled by the signal transmitted by the phasing flip-flop 22 and of which the outputs are connected to the motor 25 actuating the oscillating mirror 26.

What is claimed is:

1. An optoelectronic device for acquiring images of planes, in particular of bar codes, comprising:
   a lighting source for emitting an incident light beam,
   an electronic sensor for acquiring images,
   optical means for forming images on the electronic sensor,
   processing means for reading and decoding the images acquired by the sensor and comprising a clock adapted to emit a transfer signal $\Phi_{TG}$ of each image acquired by said sensor, said device further comprising:
   deflecting means for the incident beam comprising oscillating or rotating cyclic deflecting means carried by drive means for causing said cyclic deflecting means to oscillate or rotate in such a way that the incident beam describes, during each cycle, angular scanning adapted to generate at least one elementary scanning line on the plane, and
   closed loop control means for the drive means connected, on the one hand, to the clock in order to receive the transfer signal $\Phi_{TG}$ and, on the other hand, to said drive means and adapted to synchronize the beginning of each scanning cycle in phase and frequency with the signal $\Phi_{TG}$ emitted by the clock.

2. The optoelectronic device as claimed in claim 1, wherein:
   the cyclic deflecting means comprise a rotating polygon comprising n reflective facets,
   the drive means comprise a step-by-step motor on which the rotating polygon is mounted, said motor having a number of steps per revolution equal to kn, wherein k=x or 1/x, x being an integer, the closed loop control means comprise sequential control means of the step-by-step motor for producing control phases of said step-by-step motor synchronized with the signal $\Phi_{TG}$ emitted by the clock.

3. The optoelectronic device as claimed in claim 2, wherein the optoelectronic device comprises means for prior adjustment of the angular position of the stepper motor body.

4. The optoelectronic device as claimed in claim 3, wherein the body of the stepper motor is sandwiched between two stationary elements in which the bearings of said stepper motor are rotatably mounted, the adjustment means comprising means for fixing the body of said stepper motor to at least one of said stationary elements after prior adjustment of the angular position of said body.

5. The optoelectronic device as claimed in claim 2, wherein the sequential control means comprise sequential electronics comprising flip-flops for generating two control phases for the stepper motor.

6. The optoelectronic device as claimed in claim 2, wherein an axis of rotation of the rotating polygon is inclined to the edges of the facets by an angle α adapted such that each facet creates a shifted scanning line parallel to that created by the adjacent facets.

7. The optoelectronic device as claimed in claim 6, wherein the angle α of inclination of the axis of rotation of the rotating polygon is substantially equal to one quarter of the angle subtended by the edges delimiting a facet.

8. An optoelectronic device as claimed in claim 1, comprising a clock emitting a pixel signal $\Phi_{pix}$ for sequential reading of each image acquired by the sensor, wherein:
the means for cyclic deflection comprise an oscillating mirror mounted on drive means causing the oscillating mirror to oscillate with a predetermined amplitude between two extreme positions,
the closed loop control means for the drive means comprise:
counting means incremented by the signal $\Phi_{pix}$ for sequential reading and adapted to be reset to zero during the emission of the transfer signal $\Phi_{TG}$,
means for comparison of the value of the counting means with a stored value obtained by prior learning and representative of the phase displacement required to obtain the phase synchronization of the beginning of each scanning cycle with the signal $\Phi_{TG}$, said comparison means being adapted to emit a phase synchronization signal when the stored value corresponds to the value in the counting means,
control means for the drive means receiving the transfer signal $\Phi_{TG}$ and the phase synchronization signal and adapted to synchronize the drive means with the transfer signal $\Phi_{TG}$.

9. The optoelectronic device as claimed in claim 8, wherein the control means for the drive means comprises electronics containing flip-flops D for generating oscillating mode control signals for the drive means.

10. An optoelectronic device for use in an imager, comprising:
a clock that emits a transfer signal for each of a number of acquired images;
a deflector;
a driver coupled to oscillate or rotate the deflector; and
a closed loop control circuit coupled to control the driver with a control signal that synchronizes the beginning of each scanning cycle of the deflector in phase and frequency with the transfer signal emitted by the clock.

11. The optoelectronic device of claim 10 wherein
the deflector comprises a rotating polygon having n reflective facets,
the driver comprises a stepper motor having a number of steps per revolution equal to kn, wherein k=x or 1/x, x being an integer, and
the closed loop control circuit comprises a sequential controller that produces control phases of the stepper motor synchronized with the transfer signal emitted by the clock.

12. The optoelectronic device of claim 11 wherein an axis of rotation of the rotating polygon is inclined to the edges of the facets by an angle α adapted such that each facet creates a shifted scanning line parallel to that created by the adjacent facets.

13. The optoelectronic device of claim 10 wherein
the deflector comprises a rotating polygon having n reflective facets,
the driver comprises a stepper motor having a number of steps per revolution equal to kn, wherein k=x or 1/x, x being an integer, and
the closed loop control circuit comprises a sequential controller including flip-flops for generating two control phases for the stepper motor.

14. An optoelectronic device for acquiring images, comprising:
a lighting source for producing an incident beam;
an electronic sensor for acquiring images;
an optical component for forming images on the electronic sensor;
a deflector rotatably mounted;
a stepper motor coupled to the deflector to cyclically oscillate or rotate the deflector such that the incident beam describes, during each cycle, angular scanning that generates at least one elementary scanning line on a target plane;
a processing circuit to process images acquired by the electronic sensor, the processing circuit comprising:
a clock that emits a transfer signal for each of a number of images acquired by said sensor; and
a closed loop control circuit coupled to receive the transfer signal from the clock, and further coupled to provide phase and frequency synchronization signals to the stepper motor.

15. The optoelectronic device of claim 14 wherein
the deflector comprises a rotating polygon having n reflective facets,
the stepper motor has a number of steps per revolution equal to kn, wherein k=x or 1/x, x being an integer, and
the closed loop control circuit comprises sequential control means of the step-by-step motor for producing control phases of said step-by-step motor synchronized with the signal $\Phi_{TG}$ emitted by the clock.

16. The optoelectronic device of claim 14, wherein the closed loop control circuit comprises at least two flip-flops for generating two control phase signals for the stepper motor.

17. The optoelectronic device of claim 14 wherein the deflector comprises a rotating polygon having n reflective facets and an axis of rotation of the rotating polygon is inclined to the edges of the facets by an angle α adapted such that each facet creates a shifted scanning line parallel to that created by the adjacent facets.

18. The optoelectronic device of claim 14 wherein
the deflector comprises an oscillating mirror mounted to oscillate with a predetermined amplitude between two extreme positions,
the closed loop control circuit further comprises:
- a pixel clock emitting a pixel signal for sequential reading of each image acquired by the sensor;
- a counter incremented by the pixel signal and having a reset to zero the counter during the emission of a transfer signal,
- a comparator coupled to the counter to compare the value of the counting means with a stored value obtained by prior learning and representative of the phase displacement required to obtain the phase synchronization of the beginning of each scanning cycle with the transfer signal, said comparator emitting a phase synchronization signal when the stored value corresponds to the value in the counter.

19. An optoelectronic device for acquiring images, comprising:
- a lighting source for producing an incident beam;
- an electronic sensor for acquiring images;
- an optical component for forming images on the electronic sensor;
- a deflector rotatably mounted;
- a stepper motor coupled to the deflector to cyclically oscillate or rotate the deflector such that the incident beam describes, during each cycle, angular scanning that generates at least one elementary scanning line on a target plane;
- a processing circuit to process images acquired by the electronic sensor, the processing circuit comprising:
  - a clock that emits a transfer signal for each of a number of images acquired by said sensor;
  - a closed loop control circuit coupled to receive the transfer signal from the clock, and further coupled to provide phase and frequency synchronization signals to the stepper motor; and
  - means for prior adjustment of the angular position of the stepper motor body.

20. A method of operating an optoelectronic device, comprising:
- producing a transfer signal from a clock for each of a number of acquired images;
- producing a first phase signal;
- producing a second phase signal; and
- applying the first and the second phase signals to synchronize a stepper motor driving a deflector, the stepper motor having a number of steps that is a multiple or a sub-multiple of a number of facets on the deflector.

21. A method of operating an optoelectronic device, comprising:
- producing a transfer signal from a clock for each of a number of acquired images;
- producing a first phase signal;
- producing a second phase signal;
- applying the first and the second phase signals to synchronize a stepper motor driving a deflector, the stepper motor having a number of steps that is a multiple or a sub-multiple of a number of facets on the deflector; and
- adjusting an angular position of a body of the stepper motor to synchronize a phase of a video signal and a phase of the transfer signal.

22. A method of operating an optoelectronic device, comprising:
- producing a transfer signal for each of a number of acquired images;
- resetting a counter in response to the transfer signal;
- periodically producing a pixel signal from a clock for sequentially reading each of the acquired images;
- incrementing the counter in response to the pixel signal;
- comparing a value of the counter with a previously defined value;
- producing a phase synchronization signal when the value of the counter is equal to the previously defined value; and
- synchronizing a stepper motor based on the transfer signal and the phase synchronization signal.

* * * * *